US012754334B1

(12) United States Patent
Xu et al.

(10) Patent No.: US 12,754,334 B1
(45) Date of Patent: Oct. 6, 2026

(54) MONITORING SYSTEM AND MONITORING METHOD FOR CONCRETE FACE ROCKFILL DAM ON DEEP OVERBURDEN LAYER BASED ON MULTI-SOURCE MONITORING INFORMATION

(71) Applicant: Sichuan University, Chengdu (CN)

(72) Inventors: Nuwen Xu, Chengdu (CN); Zhuang Li, Chengdu (CN); Peiwei Xiao, Chengdu (CN); Biao Li, Chengdu (CN); Feng Gao, Chengdu (CN); Jun Liu, Chengdu (CN); Guo Liao, Chengdu (CN); Haoyu Mao, Chengdu (CN); Xinchao Ding, Chengdu (CN); Zhi Li, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 19/369,460

(22) Filed: Oct. 27, 2025

Related U.S. Application Data

(63) Continuation of application No. PCT/CN2025/123013, filed on Sep. 22, 2025.

(30) Foreign Application Priority Data

May 27, 2025 (CN) ......................... 202510689602.0

(51) Int. Cl.
*G01V 1/30* (2006.01)

(52) U.S. Cl.
CPC .............. *G01V 1/306* (2013.01); *G01V 1/307* (2013.01)

(58) Field of Classification Search
CPC ............................... G01V 1/306; G01V 1/307
See application file for complete search history.

(56) References Cited

FOREIGN PATENT DOCUMENTS

| | | | | | |
|---|---|---|---|---|---|
| CN | 203795389 U | * | 8/2014 | | |
| CN | 113338229 A | * | 9/2021 | ............... | E02B 7/06 |
| CN | 215759195 U | * | 2/2022 | | |

OTHER PUBLICATIONS

Bu et al., "Study on stress-deformation mechanism of concrete face rockfill dam based on centrifugal model test", 2023, Measurement, 216, 112973, pp. 1-14 (Year: 2023).*

(Continued)

*Primary Examiner* — Mi'schita' Henson
(74) *Attorney, Agent, or Firm* — IPro, PLLC

(57) ABSTRACT

A monitoring system and a monitoring method for a concrete face rockfill dam on a deep overburden layer based on multi-source monitoring information are provided by the present application. In the present application, the data of various dimensions are collected and analyzed in real time at multiple positions and in multiple dimensions, covering all construction positions of the dam foundation, the dam slope, and the dam body, including various monitoring results of the stress field, the displacement field, and the rupture field, comprehensive detection from local to organized, from surface to interior is achieved. The joint analysis of the monitoring data from the multiple positions avoids limitations of only analyzing a single position of the dam at present, the most comprehensive monitoring data is provided, which is conducive to understanding status and changing trends of the dam construction process.

18 Claims, 3 Drawing Sheets

(56) References Cited

OTHER PUBLICATIONS

Li et al., "Stress-deformation analysis of a concrete-faced rockfill dam on thick overburden layers", 2011, IEEE Xplore, pp. 1-7 (Year: 2011).*
Gao et al., "Study on Slope Stability of Earth Rockfill Dam in the Reinforcement Process of Building Cut-Off Wall", Nov. 8-10, 2014, 3rd ISRM Young Scholars Symposium on Rock Mechanics, Paper No. ISRM-YSS-2014-139, pp. 791-795 (Year: 2014).*
Chen et al., "Heterogeneous information phase space reconstruction and stability prediction of filling body-surrounding rock combination", 2024, Int. J. Miner. Metall. Mater., 31(2024), No. 7, pp. 1500-1511. https://doi.org/10.1007/s12613-024-2916-6 (Year: 2024).*
Zhang et al., "Research and application of rock fracturing pressure prediction method for deep oil reservoirs", 2025, Scientific Reports vol. 15, Article No. 10182, pp. 1-16 (Year: 2025).*
Ma et al., "Microseismic Monitoring, Positioning Principle, and Sensor Layout Strategy of Rock Mass Engineering", Jul. 31, 2020, Hindawi Geofluids vol. 2020, Article ID 8810391, 20 pages (Year: 2020).*

* cited by examiner

MONITORING SYSTEM AND MONITORING METHOD FOR CONCRETE FACE ROCKFILL DAM ON DEEP OVERBURDEN LAYER BASED ON MULTI-SOURCE MONITORING INFORMATION

CROSS-REFERENCES TO RELATED APPLICATIONS

The present application claims the priority of the Chinese patent application filed on May 27, 2025 before the China National Intellectual Property Administration with the application number of 202510689602.0 and the title of "MONITORING SYSTEM AND MONITORING METHOD FOR CONCRETE FACE ROCKFILL DAM ON DEEP OVERBURDEN LAYER BASED ON MULTI-SOURCE MONITORING INFORMATION", which is incorporated herein in its entirety by reference.

FIELD

The present application relates to the technology field of dam monitoring and, more particularly, to a monitoring system and a monitoring method for a concrete face rockfill dam on a deep overburden layer based on multi-source monitoring information.

BACKGROUND

In the process of cascade development of hydropower, almost all large rivers have deep overburden layers in their riverbeds. Due to significant advantages such as strong adaptability to geological conditions and simple construction, concrete face rockfill dams have become a preferred dam type for dam construction on deep overburden layer riverbeds in hydropower projects. In view of complex geological conditions of a coupled system of a concrete face rockfill dam on a deep overburden layer, a dam foundation, and a dam slope, during processes of overburden and rock excavation, and dam body filling, a mechanism of coordinated deformation and failure of the dam body, the dam foundation, and the dam slope is complex, which has become a key technical problem that restricts the safety of the construction of the concrete face rockfill dam on the deep overburden layer in large-scale hydropower projects.

At present, the deformation monitoring technology for a dam construction period of the concrete face rockfill dam on the deep overburden layer mainly includes surface deformation of the dam body, deformation of the dam foundation, displacement of the dam slope, cracks, etc. Different types of measured data in different periods are obtained by using surveying and mapping instruments or remote sensing technology, and a dam deformation situation is reflected through comparative analysis. However, at present, monitoring methods for dam deformation mainly rely on a single means to monitor a single type of data of a single part, which is difficult to fully reflect overall coordinated deformation characteristics of the dam body, the dam foundation, and the dam slope. Therefore, establishing and determining a characterization method for a concrete face rockfill dam on a deep overburden layer based on multi-source monitoring information is very important for the coordinated deformation analysis and prediction of the dam body-dam foundation-dam slope coupled system of the concrete face rockfill dam on the deep overburden layer. This is also a trend for the development of dam engineering safety monitoring technology in the future.

SUMMARY

A monitoring system and a monitoring method for a concrete face rockfill dam on a deep overburden layer based on multi-source monitoring information are provided by the present application to at least partially solve the above problems.

A monitoring system for a concrete face rockfill dam on a deep overburden layer based on multi-source monitoring information is provided by a first aspect of the present application, wherein the monitoring system includes:

a dam foundation monitoring module, configured to receive dam foundation characteristic information collected by a first monitoring device installed on the deep overburden layer;

a dam slope monitoring module, configured to receive dam slope characteristic information collected by a second monitoring device installed on a dam slope of the concrete face rockfill dam on the deep overburden layer;

a dam body rockfill body monitoring module, configured to receive dam body rockfill body characteristic information collected by a third monitoring device installed on a rockfill body of the concrete face rockfill dam on the deep overburden layer;

a dam body concrete face monitoring module, configured to receive dam body concrete face characteristic information collected by a fourth monitoring device installed on a rockfill dam concrete face of the concrete face rockfill dam on the deep overburden layer; and a data analysis module, configured to analyze the dam foundation characteristic information, the dam slope characteristic information, the dam body rockfill body characteristic information, and the dam body concrete face characteristic information, and determine a stress evolution mechanism in a process of dam foundation-dam slope rock damage inoculation, dam surface deformation characteristics of the concrete face rockfill dam on the deep overburden layer during a filling process, and displacement, stress, and temperature variation laws of typical dam sections of the concrete face rockfill dam on the deep overburden layer during the filling process.

Optionally, the first monitoring device includes a plurality of microseismic sensors that are uniformly distributed, and each of the plurality of microseismic sensors is configured to collect rupture information of a dam foundation; and the dam foundation monitoring module is configured to receive the rupture information collected by the plurality of microseismic sensors installed on the deep overburden layer, wherein the rupture information includes at least one of a microseismic event, a microseismic magnitude, a microseismic frequency, and a microseismic waveform.

Optionally, the second monitoring device includes a plurality of microseismic sensors that are uniformly distributed and a plurality of displacement meters that are uniformly distributed, each of the plurality of microseismic sensors is configured to collect rupture information of the dam slope, and each of the plurality of displacement meters is configured to measure displacement changes of a plurality of measuring points inside the dam slope; and the dam slope monitoring module is configured to receive the rupture information and displacement change information collected by the second monitoring device installed on the dam slope of the concrete face rockfill dam on the deep overburden layer.

Optionally, the third monitoring device includes a plurality of stress gauges, a plurality of settlement meters, a plurality of displacement meters and a three-dimensional laser scanning device, the plurality of stress gauges, the plurality of settlement meters, the plurality of displacement meters are uniformly distributed; the plurality of stress gauges are arranged layer by layer along with a filling process of a rockfill body to obtain stress information at different heights and different positions as a dam body rises during a dam construction process; the plurality of settlement meters are configured to observe long-term settlement differences of different parts of the rockfill body of the concrete face rockfill dam during the filling process to obtain settlement information; the plurality of displacement meters are configured for long-term observation of a horizontal displacement inside the rockfill body of the concrete face rockfill dam during the filling process to obtain displacement information; and the three-dimensional laser scanning device is configured to obtain surface deformation data of the dam body at different time steps during a filling process of the dam body, and study dam surface deformation information of the rockfill body of the concrete face rockfill dam on the deep overburden layer during the filling process to obtain surface deformation information; and the dam body rockfill body monitoring module is configured to receive the stress information, the settlement information, the displacement information, and the surface deformation information collected by the third monitoring device installed on the rockfill body of the concrete face rockfill dam on the deep overburden layer.

Optionally, the fourth monitoring device includes monitoring optical fibers during a filling process of the concrete face rockfill dam with a pouring process of a concrete face, wherein the monitoring optical fibers are configured to monitor displacement information, stress information, and temperature information of the concrete face during the pouring process of the concrete face; and the dam body concrete face monitoring module is configured to receive the displacement information, the stress information, and the temperature information of the concrete face during the pouring process of the concrete face collected by the fourth monitoring device installed on the rockfill dam concrete face of the concrete face rockfill dam on the deep overburden layer.

Optionally, the data analysis module is configured to, through continuously collecting and analyzing rupture information induced by dam foundation-dam slope excavation, grouting, and a filling process of a dam body, perform real-time online three-dimensional monitoring on the process of dam foundation-dam slope rock damage inoculation, obtain a large amount of microseismic data of progressive rupture of a dam foundation-dam slope damage area, and reveal the stress evolution mechanism in the process of dam foundation-dam slope rock damage inoculation; obtain surface deformation data of the dam body rockfill body at different time steps during the filling process of the dam body and study the dam surface deformation characteristics of the concrete face rockfill dam on the deep overburden layer during the filling process through a three-dimensional laser scanning device; obtain displacement, stress, and temperature data of the dam body concrete face at the typical dam sections during the filling process of the dam body based on distributed monitoring optical fibers, and analyze the displacement, stress, and temperature variation laws of the typical dam sections of the concrete face rockfill dam on the deep overburden layer during the filling process.

A monitoring method for a concrete face rockfill dam on a deep overburden layer based on multi-source monitoring information is provided by a second aspect of the present application, wherein the monitoring method includes:

receiving dam foundation characteristic information collected by a first monitoring device installed on the deep overburden layer;

receiving dam slope characteristic information collected by a second monitoring device installed on a dam slope of the concrete face rockfill dam on the deep overburden layer;

receiving dam body rockfill body characteristic information collected by a third monitoring device installed on a rockfill body of the concrete face rockfill dam on the deep overburden layer;

receiving dam body concrete face characteristic information collected by a fourth monitoring device installed on a rockfill dam concrete face of the concrete face rockfill dam on the deep overburden layer; and analyzing the dam foundation characteristic information, the dam slope characteristic information, the dam body rockfill body characteristic information, and the dam body concrete face characteristic information, and determining a stress evolution mechanism in a process of dam foundation-dam slope rock damage inoculation, dam surface deformation characteristics of the concrete face rockfill dam on the deep overburden layer during a filling process, and displacement, stress, and temperature variation laws of typical dam sections of the concrete face rockfill dam on the deep overburden layer during the filling process.

An electronic device is provided by a third aspect of the present application, which includes a memory, a processor, and a computer program stored on the memory and executable on the processor, wherein the processor, when executing the computer program, implements the monitoring method for the concrete face rockfill dam on the deep overburden layer based on the multi-source monitoring information as stated in the second aspect of the present application.

A non-transitory computer-readable storage medium storing a computer program is provided by a fourth aspect of the present application, wherein the computer program, when executed by a processor, implements the monitoring method as stated in the second aspect of the present application.

A computer program product is provided by a fifth aspect of the present application, which includes a computer program/instruction, wherein the computer program/instruction, when executed by a processor, implements the steps of the monitoring method as stated in the second aspect of the present application.

In the embodiments of the present application, the data of various dimensions are collected and analyzed in real time at multiple positions and in multiple dimensions, covering all construction positions of the dam foundation, the dam slope, and the dam body, including various monitoring results of the stress field, the displacement field, and the rupture field, comprehensive detection from local to organized, from surface to interior is achieved. The joint analysis of the monitoring data from the multiple positions avoids limitations of only analyzing a single position of the dam at present, the most comprehensive monitoring data is provided, which is conducive to understanding status and changing trends of the dam construction process.

In the embodiments of the present application, monitoring methods at various positions interact and complement each other during the monitoring process, more accurate and reliable analysis results and more continuous panoramic monitoring data are provided, thereby an efficient and integrated multi-dimensional monitoring system is formed. The data collected from multiple dimensions can be mutually verified, more comprehensive information on the status of dam construction projects is provided, thereby the accuracy of early warning and risk assessment is improved.

BRIEF DESCRIPTION OF THE DRAWINGS

In order to more clearly illustrate the technical solution of the present application, the drawings required to be used for the description of the present application will be briefly introduced below. Obviously, the drawings described below are some embodiments of the present application, and other drawings can be obtained according to these drawings without paying any creative labor by a person skilled in the art.

DETAILED DESCRIPTION

In order to make the above objectives, features, and advantages of the present application more obvious and understandable, the present application will be further described in detail in conjunction with the drawings and specific embodiments.

In view of the above problems, a monitoring system for a concrete face rockfill dam on a deep overburden layer based on multi-source monitoring information is provided by an embodiment of the present application, which realizes unified and systematic monitoring of multi-position and multi-monitoring information of dam body-dam foundation-dam slope during a dam construction process, and realizes multi-dimensional monitoring of the dam body-dam foundation-dam slope of the concrete face rockfill dam on the deep overburden layer, to achieve monitoring at multiple positions and in multiple dimensions, and improve the comprehensiveness and integration of the monitoring system.

Figure 1:
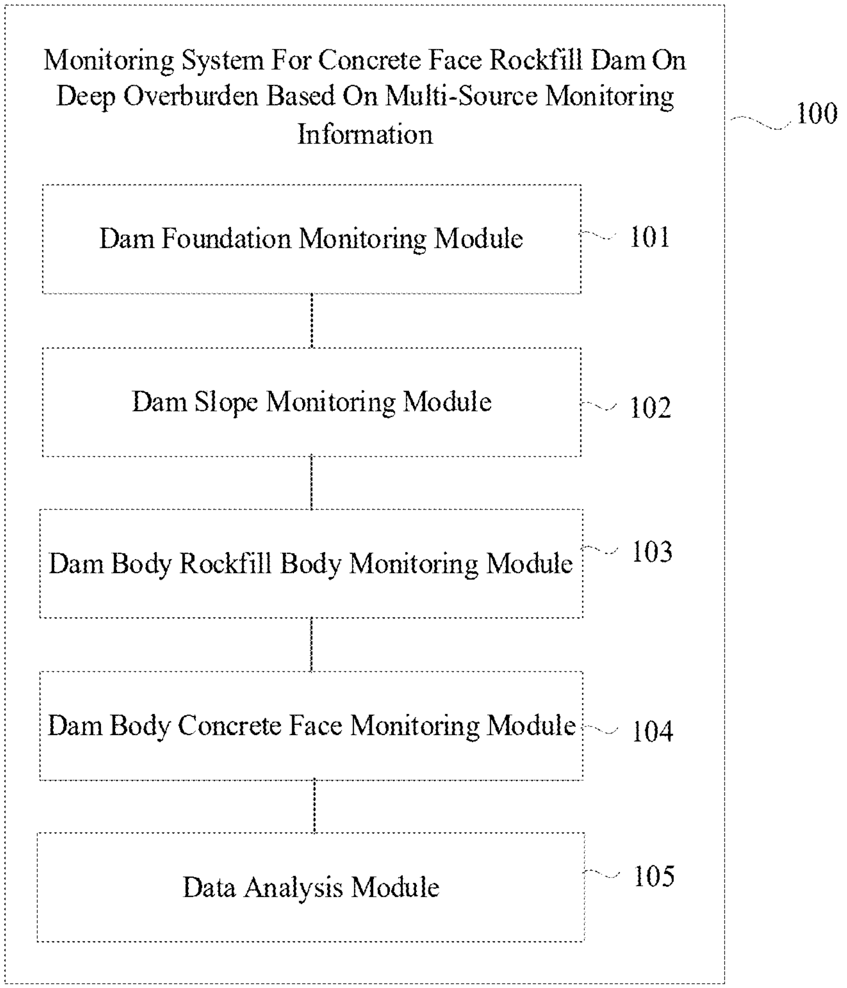
FIG. 1 is a structural block diagram of a monitoring system for a concrete face rockfill dam on a deep overburden layer based on multi-source monitoring information according to the present application.

As shown in FIG. 1, which illustrates a structural block diagram of a monitoring system for a concrete face rockfill dam on a deep overburden layer based on multi-source monitoring information provided by the present application. The monitoring system 100 for the concrete face rockfill dam on the deep overburden layer based on the multi-source monitoring information includes:

a dam foundation monitoring module 101, configured to receive dam foundation characteristic information collected by a first monitoring device installed on the deep overburden layer;

a dam slope monitoring module 102, configured to receive dam slope characteristic information collected by a second monitoring device installed on a dam slope of the concrete face rockfill dam on the deep overburden layer;

a dam body rockfill body monitoring module 103, configured to receive dam body rockfill body characteristic information collected by a third monitoring device installed on a rockfill body of the concrete face rockfill dam on the deep overburden layer;

a dam body concrete face monitoring module 104, configured to receive dam body concrete face characteristic information collected by a fourth monitoring device installed on a rockfill dam concrete face of the concrete face rockfill dam on the deep overburden layer; and a data analysis module 105, configured to analyze the dam foundation characteristic information, the dam slope characteristic information, the dam body rockfill body characteristic information, and the dam body concrete face characteristic information, and determine a stress evolution mechanism in a process of dam foundation-dam slope rock damage inoculation, dam surface deformation characteristics of the concrete face rockfill dam on the deep overburden layer during a filling process, and displacement, stress, and temperature variation laws of typical dam sections of the concrete face rockfill dam on the deep overburden layer during the filling process.

Figure 2:
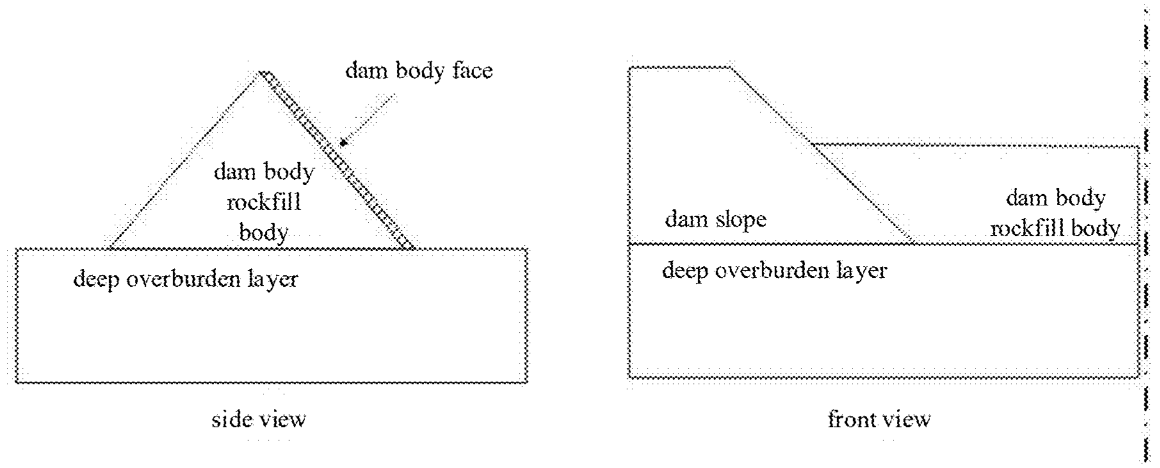
FIG. 2 is a schematic diagram of a relative relationship among a dam foundation, a dam slope, and a dam body corresponding to a monitoring system for a concrete face rockfill dam on a deep overburden layer based on multi-source monitoring information according to the present application.

FIG. 2 is a schematic diagram of a relative relationship among a dam foundation, a dam slope, and a dam body corresponding to a monitoring system for a concrete face rockfill dam on a deep overburden layer based on multi-source monitoring information according to the present application. In the embodiment of the present application, data of the dam foundation, the dam slope, a dam body rockfill body, and a dam body concrete face can be integrated to comprehensively analyze multi-position coordinated deformation of the concrete face rockfill dam on the deep overburden layer. Specifically, a multi-field (including a stress field, a displacement field, and a rupture field) dam can be formed based on the monitoring data, providing a basis for stability analysis and reinforcement design of the dam body to dynamically adjust the construction progress during the construction process and ensure the construction quality.

Specifically, the first monitoring device includes a plurality of microseismic sensors that are uniformly distributed, and each of the plurality of microseismic sensors is configured to collect rupture information of a dam foundation.

The dam foundation monitoring module is configured to receive the rupture information collected by the plurality of microseismic sensors installed on the deep overburden layer, wherein the rupture information includes at least one of a microseismic event, a microseismic magnitude, a microseismic frequency, and a microseismic waveform.

In the embodiment of the present application, the rupture information of the dam foundation can describe a rupture state of the dam foundation.

Specifically, the second monitoring device includes a plurality of microseismic sensors that are uniformly distributed and a plurality of displacement meters that are uniformly distributed, each of the plurality of microseismic sensors is configured to collect rupture information of the dam slope, and each of the plurality of displacement meters is configured to measure displacement changes of a plurality of measuring points inside the dam slope.

Figure 3:
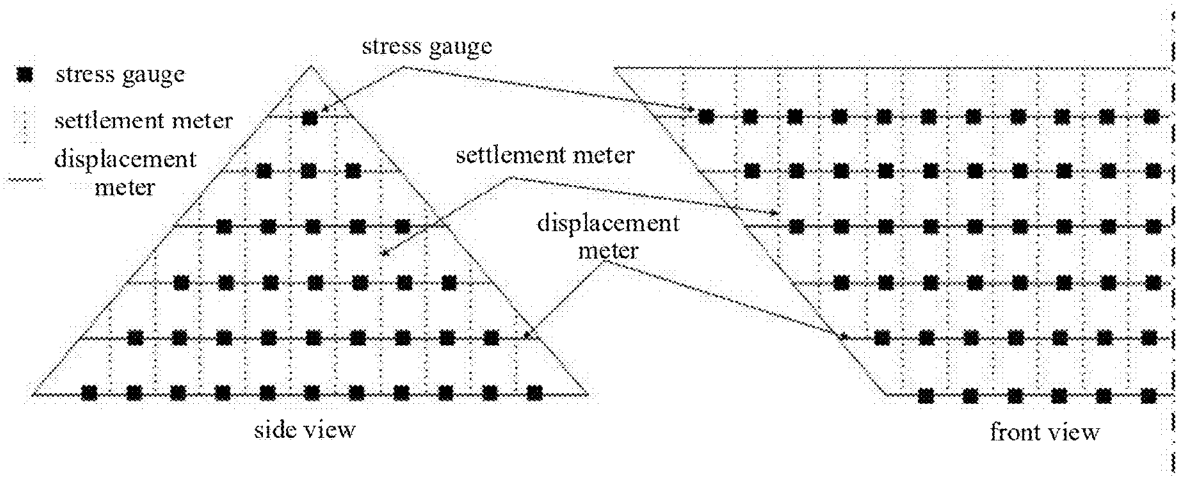
FIG. 3 is a schematic diagram of a distribution of displacement meters in a second monitoring device of a monitoring system for a concrete face rockfill dam on a deep overburden layer based on multi-source monitoring information according to the present application.

As shown in FIG. 3, which illustrates a schematic diagram of a distribution of displacement meters in a second monitoring device of a monitoring system for a concrete face rockfill dam on a deep overburden layer based on multi-source monitoring information according to the present application. In practical applications, an actual arrangement distance of displacement meters can be set according to mature arrangement standards in related art based on the on-site construction situation. The multi-point displacement meters can reasonably determine the measuring points according to the scale and complexity of the slope, and can simultaneously measure the displacement changes of the plurality of measuring points inside the slope.

The dam slope monitoring module is configured to receive the rupture information and displacement change information collected by the second monitoring device installed on the dam slope of the concrete face rockfill dam on the deep overburden layer. Deformation characteristics inside the slope can be reflected more comprehensively, and more detailed data support can be provided for slope stability analysis.

Specifically, the third monitoring device includes a plurality of stress gauges, a plurality of settlement meters, a plurality of displacement meters and a three-dimensional laser scanning device, the plurality of stress gauges, the plurality of settlement meters, the plurality of displacement meters are uniformly distributed; the plurality of stress gauges are arranged layer by layer along with a filling process of a rockfill body to obtain stress information at different heights and different positions as a dam body rises during a dam construction process; the plurality of settlement meters are configured to observe long-term settlement differences of different parts of the rockfill body of the concrete face rockfill dam during the filling process to obtain settlement information; the plurality of displacement meters are configured for long-term observation of a horizontal displacement inside the rockfill body of the concrete face rockfill dam during the filling process to obtain displacement information; and the three-dimensional laser scanning device is configured to obtain surface deformation data of the dam body at different time steps during a filling process of the dam body, and study dam surface deformation information of the rockfill body of the concrete face rockfill dam on the deep overburden layer during the filling process to obtain surface deformation information.

Figure 4:
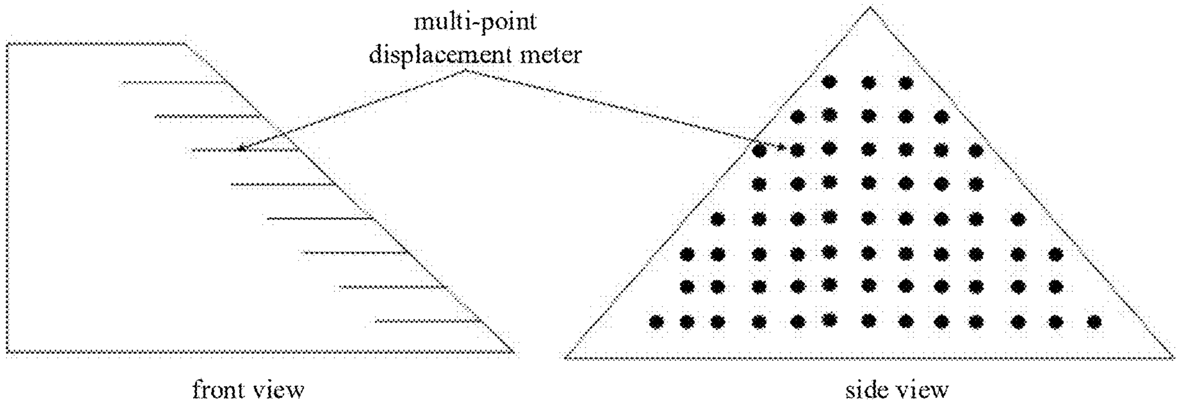
FIG. 4 is a schematic diagram of a distribution of a third monitoring device of a monitoring system for a concrete face rockfill dam on a deep overburden layer based on multi-source monitoring information according to the present application.

As shown in FIG. 4, which illustrates a schematic diagram of a distribution of stress gauges, settlement meters, and displacement meters in a third monitoring device of a monitoring system for a concrete face rockfill dam on a deep overburden layer based on multi-source monitoring information provided by the present application.

In the embodiment of the present application, the stress gauges are arranged layer by layer along with the filling process of the rockfill body to obtain the stress situations at different heights and different positions as the dam body rises during the dam construction process. The settlement meters are used for long-term observation of the long-term settlement differences of the different parts of the rockfill body of the face rockfill dam during the filling process, for example, settlement differences between the dam body in the middle of a riverbed and left and right sides of the riverbed, and settlement differences between upstream and downstream parts far from a dam axis and the dam axis and its nearby parts. The displacement meters are used for long-term observation of the horizontal displacement inside the rockfill body of the rockfill dam during the filling process to understand a horizontal deformation law of the dam body under the action of self-weight and other factors. The third characteristic of the dam body rockfill body includes the settlement information.

In the embodiment of the present application, the specific arrangement of the stress gauges, the settlement meters, and the displacement meters can be determined based on actual construction conditions and the conventional arrangement experience.

The dam body rockfill body monitoring module is configured to receive the stress information, the settlement information, the displacement information, and the surface deformation information collected by the third monitoring device installed on the rockfill body of the concrete face rockfill dam on the deep overburden layer.

Figure 5:
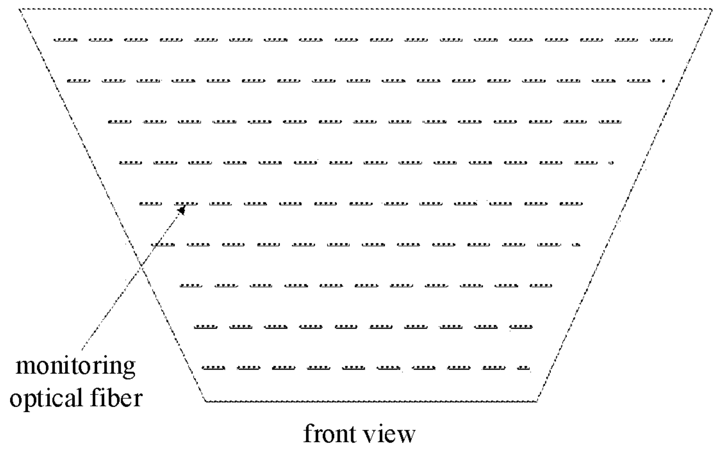
FIG. 5 is a schematic diagram of a distribution of a fourth monitoring device of a monitoring system for a concrete face rockfill dam on a deep overburden layer based on multi-source monitoring information according to the present application.

Specifically, the fourth monitoring device includes monitoring optical fibers during a filling process of the concrete face rockfill dam with a pouring process of a concrete face, wherein the monitoring optical fibers are configured to monitor displacement information, stress information, and temperature information of the concrete face during the pouring process of the concrete face. As shown in FIG. 5, which illustrates a schematic diagram of a distribution of the fourth monitoring device of a monitoring system for a concrete face rockfill dam on a deep overburden layer based on multi-source monitoring information according to the present application. In the embodiment of the present application, the specific arrangement of the monitoring optical fibers can be determined based on actual construction conditions and the conventional arrangement experience.

In the embodiment of the present application, considering that the concrete face rockfill dam is a rockfill body with large length, width, and height, and a construction method of layer-by-layer rockfill and compaction is adopted, the economy of arranging the monitoring optical fibers layer by layer is not high, and it is difficult to arrange optical fiber monitoring method in a vertical direction. It is more suitable to arrange point monitoring such as stress gauges and displacement meters. A thickness of the face in the concrete face rockfill dam is generally within 1 meter, and using optical fiber monitoring to arrange a layer of optical fibers can well cover the monitoring range.

The dam body concrete face monitoring module is configured to receive the displacement information, the stress information, and the temperature information of the concrete face during the pouring process of the concrete face collected by the fourth monitoring device installed on the rockfill dam concrete face of the concrete face rockfill dam on the deep overburden layer.

Specifically, the data analysis module is configured to, through continuously collecting and analyzing rupture information induced by dam foundation-dam slope excavation, grouting, and a filling process of a dam body, perform real-time online three-dimensional monitoring on the process of dam foundation-dam slope rock damage inoculation, obtain a large amount of microseismic data of progressive rupture of a dam foundation-dam slope damage area, and reveal the stress evolution mechanism in the process of dam foundation-dam slope rock damage inoculation; obtain surface deformation data of the dam body rockfill body at different time steps during the filling process of the dam body and study the dam surface deformation characteristics of the concrete face rockfill dam on the deep overburden layer during the filling process through a three-dimensional laser scanning device; obtain displacement, stress, and temperature data of the dam body concrete face at the typical dam sections during the filling process of the dam body based on distributed monitoring optical fibers, and analyze the displacement, stress, and temperature variation laws of the typical dam sections of the concrete face rockfill dam on the deep overburden layer during the filling process.

In the embodiment of the present application, a microseismic monitoring system based on the deep overburden layer dam foundation of the project is constructed, through continuously collecting and analyzing micro-rupture information induced by the dam foundation-dam slope excavation/grouting/filling process of the dam body is continuously collected and analyzed, real-time online three-dimensional monitoring on the process of dam foundation-dam slope rock damage inoculation is realized, a large amount of microseismic data of progressive rupture of the dam foundation-dam slope damage area is obtained, and the stress evolution mechanism in the process of dam foundation-dam slope mass damage inoculation is revealed. Specifically, when cracks appear inside the foundation of the rockfill dam, elastic wave information of ruptures can be received via microseismic sensors installed within an effective range. The time, spatial position, energy and other source parameter information of microseismic events (ruptures) can be inversely calculated by processing and analyzing the elastic wave information. By analyzing the spatiotemporal activity and the aggregation degree of the microseismic events, evolution characteristics of the ruptures can be inferred, and a potential expansion trend of cracks can be revealed. At the same time, a correlation between microseismic events on the dam foundation and the construction intensity and geological structure of the dam is obtained, to control or avoid occurrence of dangerous accidents.

The three-dimensional laser scanning device can be used to obtain the surface deformation data of the dam body rockfill body at different time steps during the filling process of the dam body and study the dam surface deformation characteristics of the concrete face rockfill dam on the deep overburden layer during the filling process. Specifically, after each filling process is completed, the dam surface of the rockfill dam can be scanned, and then data can be processed to obtain a series of three-dimensional digital models of the dam surface. Then, a relative displacement difference between a reference model and a test model is calculated by the shortest distance method, and the result of this test model is used as the reference model for the next scan. The overall evolution process of "three-dimensional deformation" of the dam body can be represented by the relative displacement difference, and ultimately, three-dimensional dynamic monitoring of the dam body can be achieved. Through continuous monitoring, scientific analysis, and timely maintenance measures, the safe and stable progress of the dam filling work are ensured.

The distributed optical fibers monitoring technology is used to obtain the displacement, stress, and temperature data of the dam body face at the typical dam sections during the filling process of the dam body, and the displacement, stress, and temperature variation laws of the typical dam sections of the concrete face rockfill dam on the deep overburden layer during the filling process are revealed, construction quality and safety are ensured. Specifically, in an embodiment of the present application, the optical fiber monitoring adopts an embedded method, where sensing optical cables are directly implanted into the concrete body through manual excavation of transverse grooves, and the concrete is backfilled for fixation. After the backfill is stable, optical fiber monitoring data collection is carried out. Acquisition of multi-field (including the stress field, strain field, and temperature field) multi-parameter data of the concrete face during the filling process of the dam concrete can be achieved.

In the embodiments of the present application, the stress gauges, the settlement meters, and the displacement meters are arranged along with the filling process of the dam body rockfill body, and the evolution characteristics of conventional stress, displacement, and settlement data of the dam body during the filling process are discussed. Based on the data of the dam foundation, the dam slope, the dam body rockfill body, and the dam body face, the multi-field (including the stress field, the displacement field, and the rupture field) dam is formed according to the monitoring data, providing the basis for stability analysis and reinforcement design of the dam body.

Therefore, in the embodiments of the present application, the data of various dimensions are collected and analyzed in real time at multiple positions and in multiple dimensions, covering all construction positions of the dam foundation, the dam slope, and the dam body, including various monitoring results of the stress field, the displacement field, and the rupture field, comprehensive detection from local to organized, from surface to interior is achieved. The joint analysis of the monitoring data from the multiple positions avoids limitations of only analyzing a single position of the dam at present, the most comprehensive monitoring data is provided, which is conducive to understanding status and changing trends of the dam construction process.

In the embodiments of the present application, monitoring methods at various positions interact and complement each other during the monitoring process, more accurate and reliable analysis results and more continuous panoramic monitoring data are provided, thereby an efficient and integrated multi-dimensional monitoring system is formed. The data collected from multiple dimensions can be mutually verified, more comprehensive information on the status of dam construction projects is provided, thereby the accuracy of early warning and risk assessment is improved.

Figure 6:
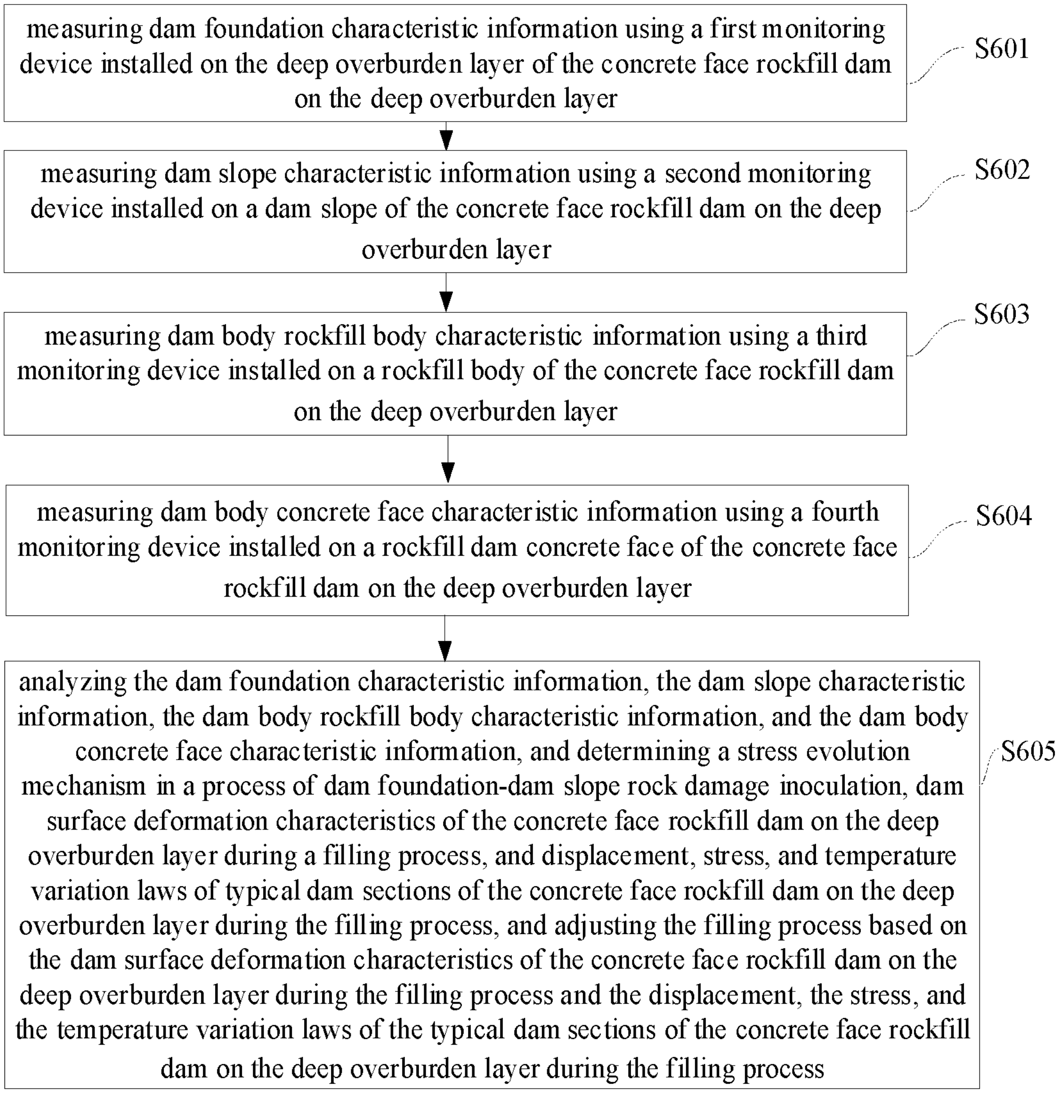
FIG. 6 is a flowchart of steps of a monitoring method for a concrete face rockfill dam on a deep overburden layer based on multi-source monitoring information according to the present application.

Based on the same inventive concept, a monitoring method for a concrete face rockfill dam on a deep overburden layer based on multi-source monitoring information is also provided in the present application. As shown in FIG. 6, the method includes:

S601: receiving dam foundation characteristic information collected by a first monitoring device installed on the deep overburden layer;

S602: receiving dam slope characteristic information collected by a second monitoring device installed on a dam slope of the concrete face rockfill dam on the deep overburden layer;

S603: receiving dam body rockfill body characteristic information collected by a third monitoring device installed on a rockfill body of the concrete face rockfill dam on the deep overburden layer;

S604: receiving dam body concrete face characteristic information collected by a fourth monitoring device installed on a rockfill dam concrete face of the concrete face rockfill dam on the deep overburden layer; and

S605: analyzing the dam foundation characteristic information, the dam slope characteristic information, the dam body rockfill body characteristic information, and the dam body concrete face characteristic information, and determining a stress evolution mechanism in a process of dam foundation-dam slope rock damage inoculation, dam surface deformation characteristics of the concrete face rockfill dam on the deep overburden layer during a filling process, and displacement, stress, and temperature variation laws of typical dam sections of the concrete face rockfill dam on the deep overburden layer during the filling process.

Optionally, the first monitoring device includes a plurality of microseismic sensors that are uniformly distributed, and each of the plurality of microseismic sensors is configured to collect rupture information of a dam foundation; and receiving the dam foundation characteristic information collected by the first monitoring device installed on the deep overburden layer includes:

receiving the rupture information collected by the plurality of microseismic sensors installed on the deep overburden layer, wherein the rupture information includes at least one of a microseismic event, a microseismic magnitude, a microseismic frequency, and a microseismic waveform.

Optionally, the second monitoring device includes a plurality of microseismic sensors that are uniformly distributed and a plurality of displacement meters that are uniformly distributed, each of the plurality of microseismic sensors is configured to collect rupture information of the dam slope, and each of the plurality of displacement meters is configured to measure displacement changes of a plurality of measuring points inside the dam slope; and receiving the dam slope characteristic information collected by the second monitoring device installed on the dam slope of the concrete face rockfill dam on the deep overburden layer includes:

receiving the rupture information and displacement change information collected by the second monitoring device installed on the dam slope of the concrete face rockfill dam on the deep overburden layer.

Optionally, the third monitoring device includes a plurality of stress gauges, a plurality of settlement meters, a plurality of displacement meters and a three-dimensional laser scanning device, the plurality of stress gauges, the plurality of settlement meters, the plurality of displacement meters are uniformly distributed; the plurality of stress gauges are arranged layer by layer along with a filling process of a rockfill body to obtain stress information at different heights and different positions as a dam body rises during a dam construction process; the plurality of settlement meters are configured to observe long-term settlement differences of different parts of the rockfill body of the concrete face rockfill dam during the filling process to obtain settlement information; the plurality of displacement meters are configured for long-term observation of a horizontal displacement inside the rockfill body of the concrete face rockfill dam during the filling process to obtain displacement information; and the three-dimensional laser scanning device is configured to obtain surface deformation data of the dam body at different time steps during a filling process of the dam body, and study dam surface deformation information of the rockfill body of the concrete face rockfill dam on the deep overburden layer during the filling process to obtain surface deformation information; and receiving the dam body rockfill body characteristic information collected by the third monitoring device installed on the rockfill body of the concrete face rockfill dam on the deep overburden layer includes:

receiving the stress information, the settlement information, the displacement information, and the surface deformation information collected by the third monitoring device installed on the rockfill body of the concrete face rockfill dam on the deep overburden layer.

Optionally, the fourth monitoring device includes monitoring optical fibers during a filling process of the concrete face rockfill dam with a pouring process of a concrete face, the monitoring optical fibers are configured to monitor displacement information, stress information, and temperature information of the concrete face during the pouring process of the concrete face; and receiving the dam body concrete face characteristic information collected by a fourth monitoring device installed on a rockfill dam concrete face of the concrete face rockfill dam on the deep overburden layer includes:

receiving the displacement information, the stress information, and the temperature information of the concrete face during the pouring process of the concrete face collected by the fourth monitoring device installed on the rockfill dam concrete face of the concrete face rockfill dam on the deep overburden layer.

Optionally, analyzing the dam foundation characteristic information, the dam slope characteristic information, the dam body rockfill body characteristic information, and the dam body concrete face characteristic information, and determining the stress evolution mechanism in the process of the dam foundation-dam slope rock damage inoculation, the dam surface deformation characteristics of the concrete face rockfill dam on the deep overburden layer during the filling process, and the displacement, stress, and temperature variation laws of the typical dam sections of the concrete face rockfill dam on the deep overburden layer during the filling process include:

through continuously collecting and analyzing rupture information induced by dam foundation-dam slope excavation, grouting, and a filling process of a dam body, performing real-time online three-dimensional monitoring on the process of dam foundation-dam slope rock damage inoculation, obtaining a large amount of microseismic data of progressive rupture of a dam foundation-dam slope damage area, and revealing the stress evolution mechanism in the process of dam foundation-dam slope rock damage inoculation; obtaining surface deformation data of the dam body rockfill body at different time steps during the filling process of the dam body and studying the dam surface deformation characteristics of the concrete face rockfill dam on the deep overburden layer during the filling process through a three-dimensional laser scanning device; obtaining displacement, stress, and temperature data of the dam body concrete face at the typical dam sections during the filling process of the dam body based on distributed monitoring optical fibers, and analyzing the displacement, stress, and temperature variation laws of the typical dam sections of the concrete face rockfill dam on the deep overburden layer during the filling process.

Based on the same inventive concept, an electronic device is also provided by the present application, which includes a memory, a processor, and a computer program stored on the memory and executable on the processor. The processor, when executing the computer program, implements the monitoring method for the concrete face rockfill dam on the deep overburden layer based on the multi-source monitoring information as described in any one of the embodiments stated above.

Based on the same inventive concept, a non-transitory computer-readable storage medium is also provided by the present application, wherein a computer program is stored on the computer-readable storage medium. The computer program, when executed by a processor, implements the steps in the monitoring method for the concrete face rockfill dam on the deep overburden layer based on the multi-source monitoring information as described in any one of the embodiments stated above.

Based on the same inventive concept, a computer program product is also provided by the present application, which includes a computer program/instruction. The computer program/instruction, when executed by a processor, implements the steps in the monitoring method for the concrete face rockfill dam on the deep overburden layer based on multi-source monitoring information as described in any one of the embodiments stated above.

The various embodiments in the present application are all described in a progressive manner, each embodiment focuses on contents different from other embodiments, and the same or similar parts between the various embodiments can be referred to each other.

Those skilled in the art should understand that the embodiments of the present application may be provided as methods, apparatuses, or computer program products. Therefore, the present application may take the form of a full hardware embodiment, a full software embodiment, or an embodiment combining software and hardware. Besides, the present application may adopt the form of a computer program product implemented on one or more computer available storage media (including but not limited to a disk memory, a CD-ROM, an optical memory and the like) containing computer available program codes.

The present application is described with reference to the flow diagram and/or block diagram of the method, terminal device (apparatus), and computer program product according to the present application. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable terminal devices to generate a machine, so that instructions executed by processors of a computer or other programmable terminal devices generate an apparatus for implementing the functions specified in one or more flows of the flow diagram and/or one or more blocks of the block diagram.

These computer program instructions can also be stored in a computer-readable memory capable of guiding a computer or other programmable terminal devices to work in a specific manner, so that instructions stored in the computer-readable memory generate a manufacturing product including an instruction apparatus, and the instruction apparatus implements the functions specified in one or more flows of the flow diagram and/or one or more blocks of the block diagram.

These computer program instructions can also be loaded on a computer or other programmable terminal devices, so that a series of operation steps are executed on the computer or other programmable terminal devices to produce computer-implemented processing, and thus, the instructions executed on the computer or other programmable terminal devices provide steps for implementing the functions specified in one or more flows of the flow diagram and/or one or more blocks of the block diagram.

Although preferred embodiments of the present application have been described, a person skilled in the art may make additional changes and modifications to these embodiments once they know the basic inventive concept. Therefore, the appended claims are intended to be interpreted as including preferred embodiments and all changes and modifications falling within the scope of the present application.

Finally, it should be noted that in the present application, relationship terms such as first and second are only used to distinguish one entity or operation from another entity or operation, and do not necessarily require or imply any such actual relationship or order between these entities or operations. Moreover, the terms "include", "contain" or any other variants thereof are intended to cover non-exclusive inclusion, so that a process, method, article or terminal device including a series of elements not only includes those elements, but also includes other elements not clearly listed, or also includes elements inherent to this process, method, article or terminal device. Without further restrictions, the elements defined by the sentence "including a . . . " do not exclude that there are other same elements in the process, method, article or terminal device including the elements.

The above provides a detailed introduction to the monitoring method of the concrete face rockfill dam on the deep overburden layer based on the multi-source monitoring information provided by the present application. Specific examples are applied in the present application to explain the principle and implementation of the present application. The above embodiments are only used to help understand the method and core idea of the present application. Meanwhile, for general technical personnel in the art, there may be changes in the specific implementation and application scope based on the idea of the present application. In summary, the contents of the specification should not be understood as limiting the present application.

The invention claimed is:

1. A monitoring method for a concrete face rockfill dam on a deep overburden layer based on multi-source monitoring information, comprising:

measuring dam foundation characteristic information using a first monitoring device installed on the deep overburden layer;

measuring dam slope characteristic information using a second monitoring device installed on a dam slope of the concrete face rockfill dam on the deep overburden layer;

measuring dam body rockfill body characteristic information using a third monitoring device installed on a rockfill body of the concrete face rockfill dam on the deep overburden layer;

measuring dam body concrete face characteristic information using a fourth monitoring device installed on a rockfill dam concrete face of the concrete face rockfill dam on the deep overburden layer; and analyzing the dam foundation characteristic information, the dam slope characteristic information, the dam body rockfill body characteristic information, and the dam body concrete face characteristic information, and determining a stress evolution mechanism in a process of dam foundation-dam slope rock damage inoculation, dam surface deformation characteristics of the concrete face rockfill dam on the deep overburden layer during a filling process, and displacement, stress, and temperature variation laws of typical dam sections of the concrete face rockfill dam on the deep overburden layer during the filling process, and adjusting the filling process based on the dam surface deformation characteristics of the concrete face rockfill dam on the deep overburden layer during the filling process and the displacement, the stress, and the temperature variation laws of the typical dam sections of the concrete face rockfill dam on the deep overburden layer during the filling process.

2. The monitoring method for the concrete face rockfill dam on the deep overburden layer based on the multi-source monitoring information according to claim 1, wherein the first monitoring device comprises a plurality of microseismic sensors that are uniformly distributed, and each of the plurality of microseismic sensors is configured to collect rupture information of a dam foundation; and measuring the dam foundation characteristic information using the first monitoring device installed on the deep overburden layer comprises:

measuring the rupture information using the plurality of microseismic sensors installed on the deep overburden layer, wherein the rupture information comprises at least one of a microseismic event, a microseismic magnitude, a microseismic frequency, and a microseismic waveform.

3. The monitoring method for the concrete face rockfill dam on the deep overburden layer based on the multi-source monitoring information according to claim 1, wherein the second monitoring device comprises a plurality of microseismic sensors that are uniformly distributed and a plurality of displacement meters that are uniformly distributed, each of the plurality of microseismic sensors is configured to collect rupture information of the dam slope, and each of the plurality of displacement meters is configured to measure displacement changes of a plurality of measuring points inside the dam slope; and measuring the dam slope characteristic information using the second monitoring device installed on the dam slope of the concrete face rockfill dam on the deep overburden layer comprises:

measuring the rupture information and displacement change information using the second monitoring device installed on the dam slope of the concrete face rockfill dam on the deep overburden layer.

4. The monitoring method for the concrete face rockfill dam on the deep overburden layer based on the multi-source monitoring information according to claim 1, wherein the third monitoring device comprises a plurality of stress gauges, a plurality of settlement meters, a plurality of displacement meters and a three-dimensional laser scanning device, the plurality of stress gauges, the plurality of settlement meters, the plurality of displacement meters are uniformly distributed; the plurality of stress gauges are arranged layer by layer along with a filling process of a rockfill body to obtain stress information at different heights and different positions as a dam body rises during a dam construction process; the plurality of settlement meters are configured to observe long-term settlement differences of different parts of the rockfill body of the concrete face rockfill dam during the filling process to obtain settlement information; the plurality of displacement meters are configured for long-term observation of a horizontal displacement inside the rockfill body of the concrete face rockfill dam during the filling process to obtain displacement information; and the three-dimensional laser scanning device is configured to obtain surface deformation data of the dam body at different time steps during a filling process of the dam body, and study dam surface deformation information of the rockfill body of the concrete face rockfill dam on the deep overburden layer during the filling process to obtain surface deformation information; and measuring the dam body rockfill body characteristic information using the third monitoring device installed on the rockfill body of the concrete face rockfill dam on the deep overburden layer comprises:

measuring the stress information, the settlement information, the displacement information, and the surface deformation information using the third monitoring device installed on the rockfill body of the concrete face rockfill dam on the deep overburden layer.

5. The monitoring method for the concrete face rockfill dam on the deep overburden layer based on the multi-source monitoring information according to claim 1, wherein the fourth monitoring device comprises monitoring optical fibers during a filling process of the concrete face rockfill dam with a pouring process of a concrete face, the monitoring optical fibers are configured to monitor displacement information, stress information, and temperature information of the concrete face during the pouring process of the concrete face; and measuring the dam body concrete face characteristic information using the fourth monitoring device installed on the rockfill dam concrete face of the concrete face rockfill dam on the deep overburden layer comprises:

measuring the displacement information, the stress information, and the temperature information of the concrete face during the pouring process of the concrete face using the fourth monitoring device installed on the rockfill dam concrete face of the concrete face rockfill dam on the deep overburden layer.

6. The monitoring method for the concrete face rockfill dam on the deep overburden layer based on the multi-source monitoring information according to claim 1, wherein analyzing the dam foundation characteristic information, the dam slope characteristic information, the dam body rockfill body characteristic information, and the dam body concrete face characteristic information, and determining the stress evolution mechanism in the process of the dam foundation-dam slope rock damage inoculation, the dam surface deformation characteristics of the concrete face rockfill dam on the deep overburden layer during the filling process, and the displacement, stress, and temperature variation laws of the typical dam sections of the concrete face rockfill dam on the deep overburden layer during the filling process comprise:

through continuously collecting and analyzing rupture information induced by dam foundation-dam slope excavation, grouting, and a filling process of a dam body, performing real-time online three-dimensional monitoring on the process of dam foundation-dam slope rock damage inoculation, obtaining a large amount of microseismic data of progressive rupture of a dam foundation-dam slope damage area, and revealing the stress evolution mechanism in the process of dam foundation-dam slope rock damage inoculation; obtaining surface deformation data of the dam body rockfill body at different time steps during the filling process of the dam body and studying the dam surface deformation characteristics of the concrete face rockfill dam on the deep overburden layer during the filling process through a three-dimensional laser scanning device; obtaining displacement, stress, and temperature data of the dam body concrete face at the typical dam sections during the filling process of the dam body based on distributed monitoring optical fibers, and analyzing the displacement, stress, and temperature variation laws of the typical dam sections of the concrete face rockfill dam on the deep overburden layer during the filling process.

7. An electronic device, comprising a memory, a processor, and a computer program stored on the memory and executable on the processor, wherein the processor, when executing the computer program, implements the monitoring method for the concrete face rockfill dam on the deep overburden layer based on the multi-source monitoring information according to claim 1.

8. The electronic device according to claim 7, wherein the first monitoring device comprises a plurality of microseismic sensors that are uniformly distributed, and each of the plurality of microseismic sensors is configured to collect rupture information of a dam foundation; and measuring the dam foundation characteristic information using the first monitoring device installed on the deep overburden layer comprises:

measuring the rupture information using the plurality of microseismic sensors installed on the deep overburden layer, wherein the rupture information comprises at least one of a microseismic event, a microseismic magnitude, a microseismic frequency, and a microseismic waveform.

9. The electronic device according to claim 7, wherein the second monitoring device comprises a plurality of microseismic sensors that are uniformly distributed and a plurality of displacement meters that are uniformly distributed, each of the plurality of microseismic sensors is configured to collect rupture information of the dam slope, and each of the plurality of displacement meters is configured to measure displacement changes of a plurality of measuring points inside the dam slope; and measuring the dam slope characteristic information using the second monitoring device installed on the dam slope of the concrete face rockfill dam on the deep overburden layer comprises:

measuring the rupture information and displacement change information using the second monitoring device installed on the dam slope of the concrete face rockfill dam on the deep overburden layer.

10. The electronic device according to claim 7, wherein the third monitoring device comprises a plurality of stress gauges, a plurality of settlement meters, a plurality of displacement meters and a three-dimensional laser scanning device, the plurality of stress gauges, the plurality of settlement meters, the plurality of displacement meters are uniformly distributed; the plurality of stress gauges are arranged layer by layer along with a filling process of a rockfill body to obtain stress information at different heights and different positions as a dam body rises during a dam construction process; the plurality of settlement meters are configured to observe long-term settlement differences of different parts of the rockfill body of the concrete face rockfill dam during the filling process to obtain settlement information; the plurality of displacement meters are configured for long-term observation of a horizontal displacement inside the rockfill body of the concrete face rockfill dam during the filling process to obtain displacement information; and the three-dimensional laser scanning device is configured to obtain surface deformation data of the dam body at different time steps during a filling process of the dam body, and study dam surface deformation information of the rockfill body of the concrete face rockfill dam on the deep overburden layer during the filling process to obtain surface deformation information; and measuring the dam body rockfill body characteristic information using the third monitoring device installed on the rockfill body of the concrete face rockfill dam on the deep overburden layer comprises:

measuring the stress information, the settlement information, the displacement information, and the surface deformation information using the third monitoring device installed on the rockfill body of the concrete face rockfill dam on the deep overburden layer.

11. The electronic device according to claim 7, wherein the fourth monitoring device comprises monitoring optical fibers during a filling process of the concrete face rockfill dam with a pouring process of a concrete face, the monitoring optical fibers are configured to monitor displacement information, stress information, and temperature information of the concrete face during the pouring process of the concrete face; and measuring the dam body concrete face characteristic information using the fourth monitoring device installed on the rockfill dam concrete face of the concrete face rockfill dam on the deep overburden layer comprises:

measuring the displacement information, the stress information, and the temperature information of the concrete face during the pouring process of the concrete face using the fourth monitoring device installed on the rockfill dam concrete face of the concrete face rockfill dam on the deep overburden layer.

12. The electronic device according to claim 7, wherein analyzing the dam foundation characteristic information, the dam slope characteristic information, the dam body rockfill body characteristic information, and the dam body concrete face characteristic information, and determining the stress evolution mechanism in the process of the dam foundation-dam slope rock damage inoculation, the dam surface deformation characteristics of the concrete face rockfill dam on the deep overburden layer during the filling process, and the displacement, stress, and temperature variation laws of the typical dam sections of the concrete face rockfill dam on the deep overburden layer during the filling process comprise:

through continuously collecting and analyzing rupture information induced by dam foundation-dam slope excavation, grouting, and a filling process of a dam body, performing real-time online three-dimensional monitoring on the process of dam foundation-dam slope rock damage inoculation, obtaining a large amount of microseismic data of progressive rupture of a dam foundation-dam slope damage area, and revealing the stress evolution mechanism in the process of dam foundation-dam slope rock damage inoculation; obtaining surface deformation data of the dam body rockfill body at different time steps during the filling process of the dam body and studying the dam surface deformation characteristics of the concrete face rockfill dam on the deep overburden layer during the filling process through a three-dimensional laser scanning device; obtaining displacement, stress, and temperature data of the dam body concrete face at the typical dam sections during the filling process of the dam body based on distributed monitoring optical fibers, and analyzing the displacement, stress, and temperature variation laws of the typical dam sections of the concrete face rockfill dam on the deep overburden layer during the filling process.

13. A non-transitory computer-readable storage medium storing a computer program, wherein the computer program, when executed by a processor, implements the monitoring method for the concrete face rockfill dam on the deep overburden layer based on the multi-source monitoring information according to claim 1.

14. The non-transitory computer-readable storage medium according to claim 13, wherein the first monitoring device comprises a plurality of microseismic sensors that are uniformly distributed, and each of the plurality of microseismic sensors is configured to collect rupture information of a dam foundation; and measuring the dam foundation characteristic information using the first monitoring device installed on the deep overburden layer comprises:

measuring the rupture information using the plurality of microseismic sensors installed on the deep overburden layer, wherein the rupture information comprises at least one of a microseismic event, a microseismic magnitude, a microseismic frequency, and a microseismic waveform.

15. The non-transitory computer-readable storage medium according to claim 13, wherein the second monitoring device comprises a plurality of microseismic sensors that are uniformly distributed and a plurality of displacement meters that are uniformly distributed, each of the plurality of microseismic sensors is configured to collect rupture information of the dam slope, and each of the plurality of displacement meters is configured to measure displacement changes of a plurality of measuring points inside the dam slope; and measuring the dam slope characteristic information using the second monitoring device installed on the dam slope of the concrete face rockfill dam on the deep overburden layer comprises:

measuring the rupture information and displacement change information using the second monitoring device installed on the dam slope of the concrete face rockfill dam on the deep overburden layer.

16. The non-transitory computer-readable storage medium according to claim 13, wherein the third monitoring device comprises a plurality of stress gauges, a plurality of settlement meters, a plurality of displacement meters and a three-dimensional laser scanning device, the plurality of stress gauges, the plurality of settlement meters, the plurality of displacement meters are uniformly distributed; the plurality of stress gauges are arranged layer by layer along with a filling process of a rockfill body to obtain stress information at different heights and different positions as a dam body rises during a dam construction process; the plurality of settlement meters are configured to observe long-term settlement differences of different parts of the rockfill body of the concrete face rockfill dam during the filling process to obtain settlement information; the plurality of displacement meters are configured for long-term observation of a horizontal displacement inside the rockfill body of the concrete face rockfill dam during the filling process to obtain displacement information; and the three-dimensional laser scanning device is configured to obtain surface deformation data of the dam body at different time steps during a filling process of the dam body, and study dam surface deformation information of the rockfill body of the concrete face rockfill dam on the deep overburden layer during the filling process to obtain surface deformation information; and measuring the dam body rockfill body characteristic information using the third monitoring device installed on the rockfill body of the concrete face rockfill dam on the deep overburden layer comprises:

measuring the stress information, the settlement information, the displacement information, and the surface deformation information using the third monitoring device installed on the rockfill body of the concrete face rockfill dam on the deep overburden layer.

17. The non-transitory computer-readable storage medium according to claim 13, wherein the fourth monitoring device comprises monitoring optical fibers during a filling process of the concrete face rockfill dam with a pouring process of a concrete face, the monitoring optical fibers are configured to monitor displacement information, stress information, and temperature information of the concrete face during the pouring process of the concrete face; and measuring the dam body concrete face characteristic information using the fourth monitoring device installed on the rockfill dam concrete face of the concrete face rockfill dam on the deep overburden layer comprises:

measuring the displacement information, the stress information, and the temperature information of the concrete face during the pouring process of the concrete face using the fourth monitoring device installed on the rockfill dam concrete face of the concrete face rockfill dam on the deep overburden layer.

18. The non-transitory computer-readable storage medium according to claim 13, wherein analyzing the dam foundation characteristic information, the dam slope characteristic information, the dam body rockfill body characteristic information, and the dam body concrete face characteristic information, and determining the stress evolution mechanism in the process of the dam foundation-dam slope rock damage inoculation, the dam surface deformation characteristics of the concrete face rockfill dam on the deep overburden layer during the filling process, and the displacement, stress, and temperature variation laws of the typical dam sections of the concrete face rockfill dam on the deep overburden layer during the filling process comprise:

through continuously collecting and analyzing rupture information induced by dam foundation-dam slope excavation, grouting, and a filling process of a dam body, performing real-time online three-dimensional monitoring on the process of dam foundation-dam slope rock damage inoculation, obtaining a large amount of microseismic data of progressive rupture of a dam foundation-dam slope damage area, and revealing the stress evolution mechanism in the process of dam foundation-dam slope rock damage inoculation; obtaining surface deformation data of the dam body rockfill body at different time steps during the filling process of the dam body and studying the dam surface deformation characteristics of the concrete face rockfill dam on the deep overburden layer during the filling process through a three-dimensional laser scanning device; obtaining displacement, stress, and temperature data of the dam body concrete face at the typical dam sections during the filling process of the dam body based on distributed monitoring optical fibers, and analyzing the displacement, stress, and temperature variation laws of the typical dam sections of the concrete face rockfill dam on the deep overburden layer during the filling process.

* * * * *